United States Patent
Dozier et al.

(10) Patent No.: US 9,876,333 B2
(45) Date of Patent: Jan. 23, 2018

(54) PANELBOARD BREAKER COMPARTMENT WITH DISCONNECT FEATURES

(71) Applicant: SCHNEIDER ELECTRIC USA, INC., Andover, MA (US)

(72) Inventors: Steven W. Dozier, Murfreesboro, TN (US); Jacob E. Walgenbach, La Vergne, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 15/129,441

(22) PCT Filed: Mar. 31, 2014

(86) PCT No.: PCT/US2014/032322
§ 371 (c)(1),
(2) Date: Sep. 27, 2016

(87) PCT Pub. No.: WO2015/152864
PCT Pub. Date: Oct. 8, 2015

(65) Prior Publication Data
US 2017/0110856 A1 Apr. 20, 2017

(51) Int. Cl.
*H02B 1/052* (2006.01)
*H01H 71/02* (2006.01)
*H02B 1/30* (2006.01)

(52) U.S. Cl.
CPC ......... *H02B 1/052* (2013.01); *H01H 71/0264* (2013.01); *H01H 2300/056* (2013.01); *H02B 1/306* (2013.01)

(58) Field of Classification Search
CPC ........ H02B 1/04–1/0526; H02B 1/306; H01H 71/0264; H01H 2300/056

USPC .................................. 361/634–636, 652–656
See application file for complete search history.

(56) References Cited

U.S. PATENT DOCUMENTS

| | | | |
|---|---|---|---|
| 2,786,113 A * | 3/1957 | Norden | H01H 71/7436 335/42 |
| 3,142,003 A | 7/1964 | Olashaw | |
| 3,714,383 A * | 1/1973 | Leonard et al. | H01H 27/00 200/330 |
| 4,139,748 A | 2/1979 | Wolfe et al. | |
| 4,532,486 A * | 7/1985 | Terrier | H01H 89/08 335/13 |
| 4,789,919 A | 12/1988 | Cox et al. | |

(Continued)

FOREIGN PATENT DOCUMENTS

WO 2011000838 A1 1/2011

OTHER PUBLICATIONS

International Search Report and Written Opinion dated Aug. 12, 2014 in PCT/US2014/032322, 19pp.

Primary Examiner — Zachary M Pape
Assistant Examiner — Amir Jalali
(74) Attorney, Agent, or Firm — Locke Lord LLP

(57) ABSTRACT

A circuit breaker may be plugged into a breaker compartment in a panelboard without making a connection to a power bus of the panel board. A tool may be inserted into the breaker compartment to operate movable contacts that connect, or disconnect, the circuit breaker from the power bus without de-energizing the power line network. Inserting the tool into the breaker compartment first causes a trip actuator to trip the circuit breaker.

14 Claims, 12 Drawing Sheets

(56) References Cited

U.S. PATENT DOCUMENTS

| | | | | | |
|---|---|---|---|---|---|
| 4,823,231 | A | * | 4/1989 | Jego | H02B 1/04 200/50.24 |
| 5,495,388 | A | * | 2/1996 | Bonetti | H02B 11/12 200/50.1 |
| 5,510,960 | A | | 4/1996 | Rosen | |
| 6,337,449 | B1 | | 1/2002 | Brouillat et al. | |
| 8,199,022 | B2 | * | 6/2012 | Morris | G01R 1/04 340/10.34 |
| 8,305,739 | B2 | | 11/2012 | Dozier | |
| 8,476,992 | B2 | | 7/2013 | Yang et al. | |
| 8,514,551 | B2 | | 8/2013 | Cosley et al. | |
| 2002/0033323 | A1 | * | 3/2002 | Ehrensberger | H01H 13/06 200/302.2 |
| 2004/0239458 | A1 | * | 12/2004 | Harmon | H01H 77/02 335/174 |
| 2007/0095640 | A1 | * | 5/2007 | Fischer | H01H 3/08 200/330 |
| 2008/0079436 | A1 | | 4/2008 | Gollhardt et al. | |
| 2008/0258667 | A1 | | 10/2008 | Morris et al. | |
| 2010/0024191 | A1 | | 2/2010 | Ledbetter | |
| 2010/0118473 | A1 | | 5/2010 | Morris et al. | |
| 2010/0133074 | A1 | * | 6/2010 | Eppe | H01H 9/285 200/43.16 |
| 2011/0110049 | A1 | | 5/2011 | Lehtola et al. | |
| 2011/0149480 | A1 | | 6/2011 | Leeman et al. | |
| 2012/0064746 | A1 | * | 3/2012 | Bellows | H02B 1/36 439/212 |
| 2012/0127636 | A1 | | 5/2012 | Abrahamsen et al. | |
| 2012/0228097 | A1 | | 9/2012 | Gemme et al. | |

\* cited by examiner

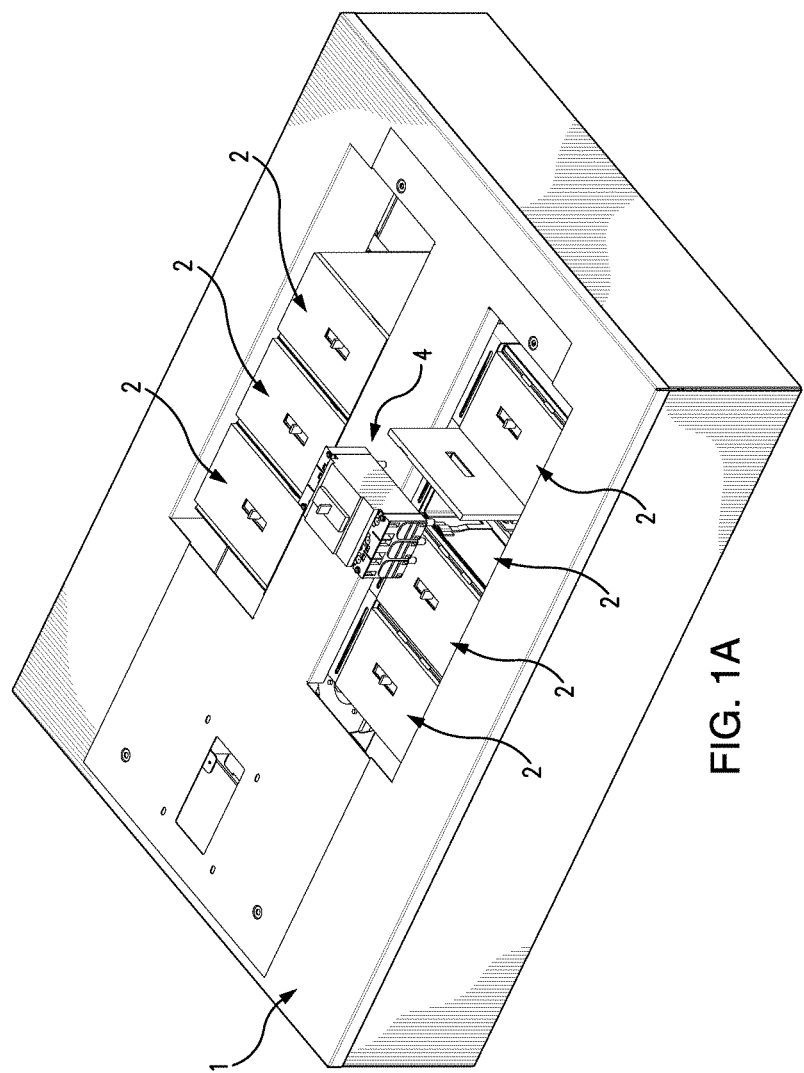

PANELBOARD BREAKER COMPARTMENT WITH DISCONNECT FEATURES

FIELD OF THE INVENTION

The invention disclosed relates to electrical power distribution enclosures.

BACKGROUND

When inserting, removing or working on a circuit breaker in a panelboard, an operator typically turns off the power to the panelboard beforehand. Otherwise, the operator may be exposed to serious electrical hazard, such as an energized conductor or an arc flash. However, in applications where multiple loads are connected to the panelboard, such as a bank of electric motors, an interruption of power to the other loads is a major inconvenience.

SUMMARY

The invention disclosed is a breaker compartment that plugs into the power bus of an electrical power distribution enclosure, such as a panelboard. The breaker compartment includes a housing that has an access side through which to receive a circuit breaker and a bus connector on the outside of the housing. The breaker compartment also includes a tool interface for receiving an operational tool, a trip actuator, a power connector actuator and a guide slot. The trip actuator is configured to trip the circuit breaker when an operational tool is received in the tool interface. The power connection actuator is configured to be operated by the operational tool via the tool interface, to electrically connect the circuit breaker, via the bus connector, to the power bus or to electrically disconnect the circuit breaker, via the bus connector, from the power bus. The guide slot is configured to prevent the power connection actuator from electrically connecting the circuit breaker to the power bus, until the circuit breaker is tripped by the trip actuator.

Accordingly, a circuit breaker may be mounted inside to the breaker compartment without making a connection to the power bus. The operator may then insert an operational tool into the breaker compartment via the tool interface and safely connect or disconnect the circuit breaker from the power bus without de-energizing the power bus. For example, the action of inserting the tool into the tool interface of the breaker compartment causes the trip actuator to trip the circuit breaker, before the guide slot permits the tool to be moved by the operator to connect the circuit breaker to the power bus. After the circuit breaker has been tripped, the guide slot permits the operator to move the tool via the tool interface and to operate the power connection actuator in order to electrically connect the circuit breaker to the power bus. The trip actuator is spring-loaded so that when the operator removes the tool from the breaker compartment, the trip actuator resumes its original position where it can trip the circuit breaker the next time the tool is inserted into the tool interface. This prevents a later disconnection of the circuit breaker from the power bus, without first tripping the circuit breaker. The guide slot provides a failsafe function by preventing the circuit breaker from resetting its contacts to the "on" position unless the circuit breaker is fully connected to or fully disconnected from the power bus, whether or not the tool remains inserted.

DESCRIPTION OF THE FIGURES

FIG. 1A is a front perspective view from the top left side of an example embodiment of the invention in a panelboard, illustrating an arrangement of breaker compartments accessible through the front cover of the panelboard, with a circuit breaker shown being inserted into one of the breaker compartments.

DESCRIPTION OF EMBODIMENTS OF THE INVENTION

FIG. 1A is a front perspective view from the top left side of an example embodiment of the invention in an electrical power distribution enclosure such as a panelboard 1, illustrating an arrangement of breaker compartments 2 accessible through the front cover of the panelboard. A circuit breaker 4 is shown being inserted into one of the breaker compartments 2. The breaker compartment 2 is suitable for a variety of power distribution electrical enclosures, such as the panelboard, to house the circuit breaker 4 and to enable safely connecting and disconnecting the circuit breaker 4 from the power line network without de-energizing the network.

Figure 1B:
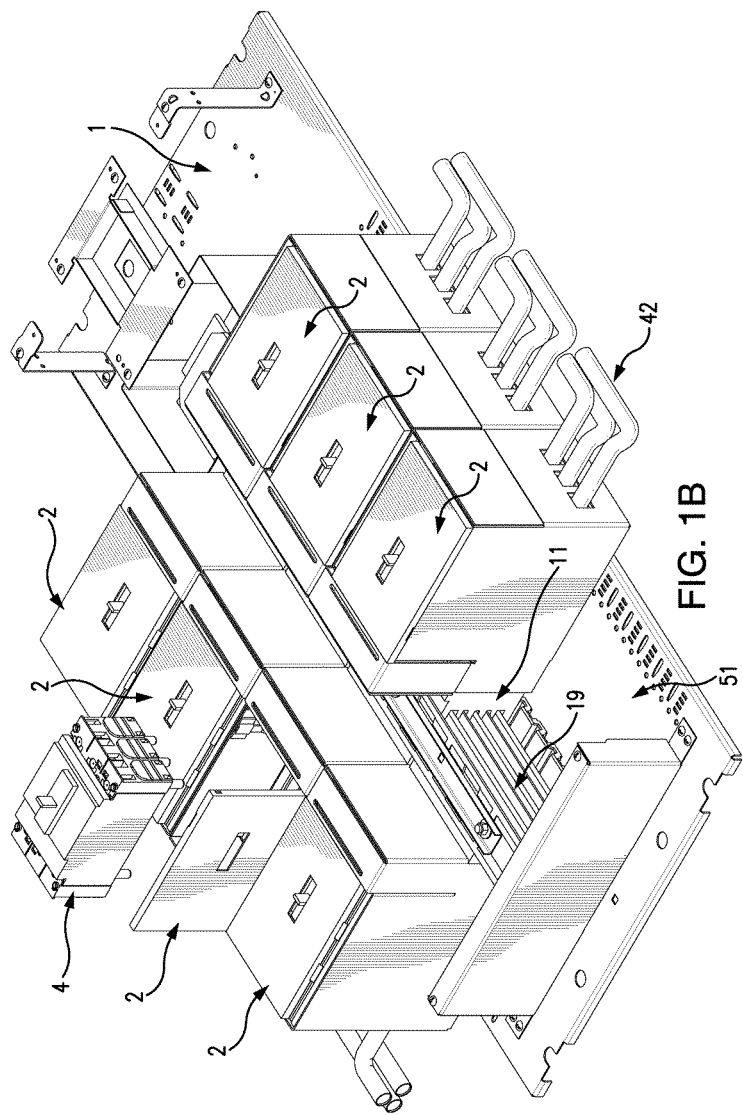
FIG. 1B is a front perspective view from the top right side of an example embodiment of the invention in the panelboard shown in FIG. 1A, with the front face of the panelboard having been removed to show the arrangement of breaker compartments plugged into the power bus of the panel board.

FIG. 1B is a front perspective view from the top right side of an example embodiment of the invention in the panelboard 1 shown in FIG. 1A, illustrating the arrangement of breaker compartments 2 plugged into a power bus 19 of the panel board 1. A circuit breaker 4 is being inserted into one of the breaker compartments 2. The breaker compartment 2 fits within the panelboard 1 and includes a bus connector 11 that plugs into the phases of a common power bus 19 running along the back 51 of the panelboard 1, for example an I-line style bus. In an example embodiment, three branch circuit wires 42 are shown distributed from the breaker compartment 2, in a three phase application. In another example embodiment, a four-wire application may include a neutral phase. The figure shows the front face of the panelboard having been removed.

Figure 2A:
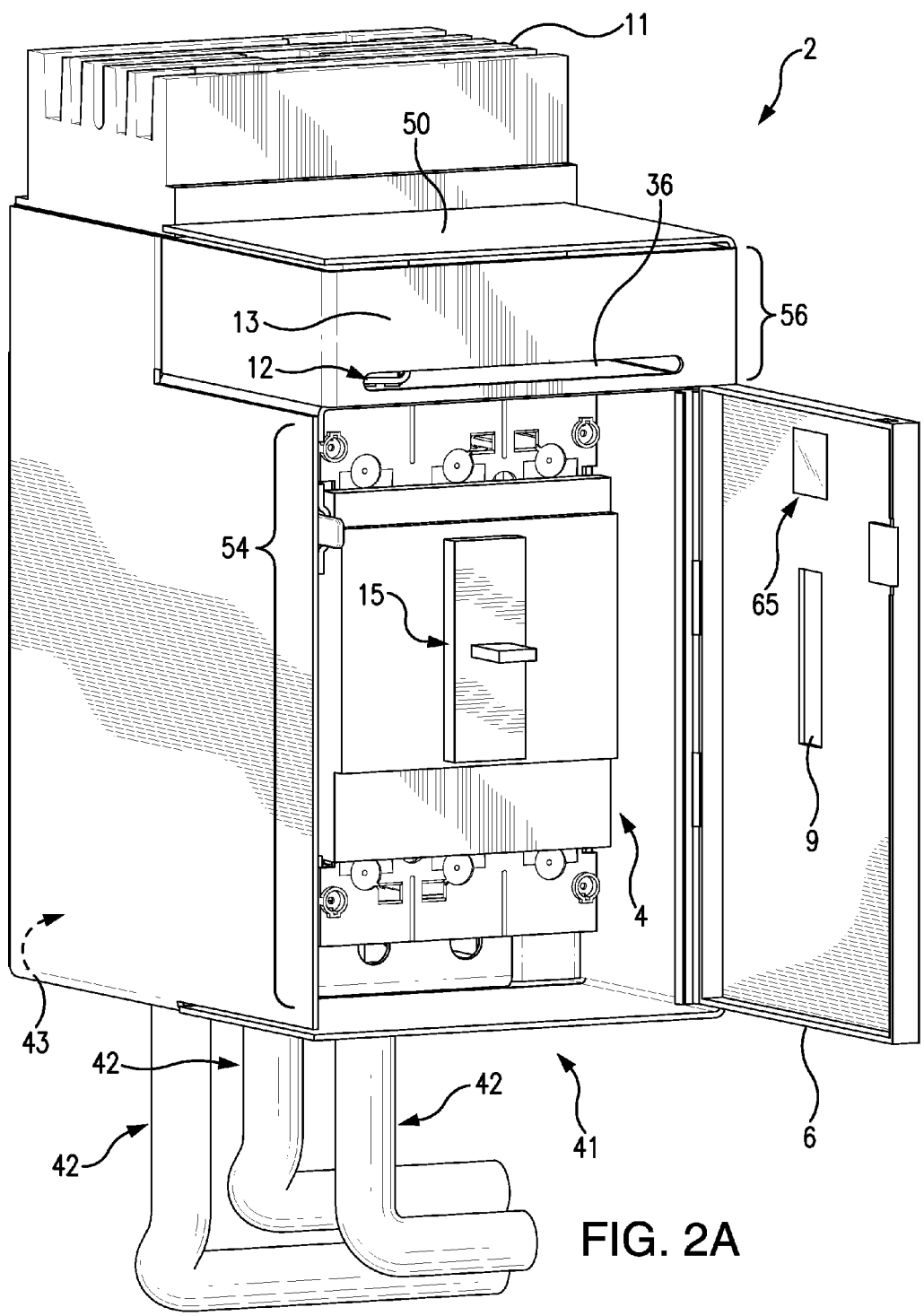
FIG. 2A is a front perspective view from the top left side of an example embodiment of the invention, illustrating the housing of the breaker compartment with the door of the housing shown open to show a circuit breaker inserted into a plug-on base in the breaker compartment.

FIG. 2A is a front perspective view from the top left side of an example embodiment of the invention, illustrating the housing of the breaker compartment 2. The breaker compartment 2 is an accessible compartment that has an access side on the front 41, through which the circuit breaker 4 may be inserted without making electrical connection to the power bus 19. A door 6 of the housing is hinged on the access side on the front 41 of the housing. The door is open to show a circuit breaker 4 having been inserted into a plug-on base 21 (shown in FIG. 2B) in the breaker compartment. An on/off switch 15 of the circuit breaker 4 will project through an aperture 9 in the door 6 when the door is closed. The figure further shows the housing including the bus connector 11 to plug into the power bus 19 in the electrical power distribution enclosure 1. The breaker compartment 2 is configured to electrically plug into the power bus 19 of the panelboard 1, with its top 50 oriented toward the power bus. The back 43 of the breaker compartment 2 is oriented toward the back 51 of the panel board 1 (shown in FIG. 1B).

The breaker compartment 2 is divided into a lower section 54 that is separated by a partition 52 (shown in FIG. 6) from an upper section 56. The lower section 54 is designed to house the circuit breaker 4 and various conductors and components that will be energized. The upper section 56 that is physically and electrically isolated from the lower section 54, houses various linkages that enable connecting and disconnecting the circuit breaker 4 with the power line network. An operational tool, for example, a screw driver, may be inserted into a tool receiver 12 through a tool access slot 36 in the front cover 13 of the upper section 56 of the breaker compartment 2, located above the door 6. An observation window 65 is shown in the door 6 of the housing. The three branch circuit wires 42 are shown distributed from the breaker compartment 2.

Figure 2B:
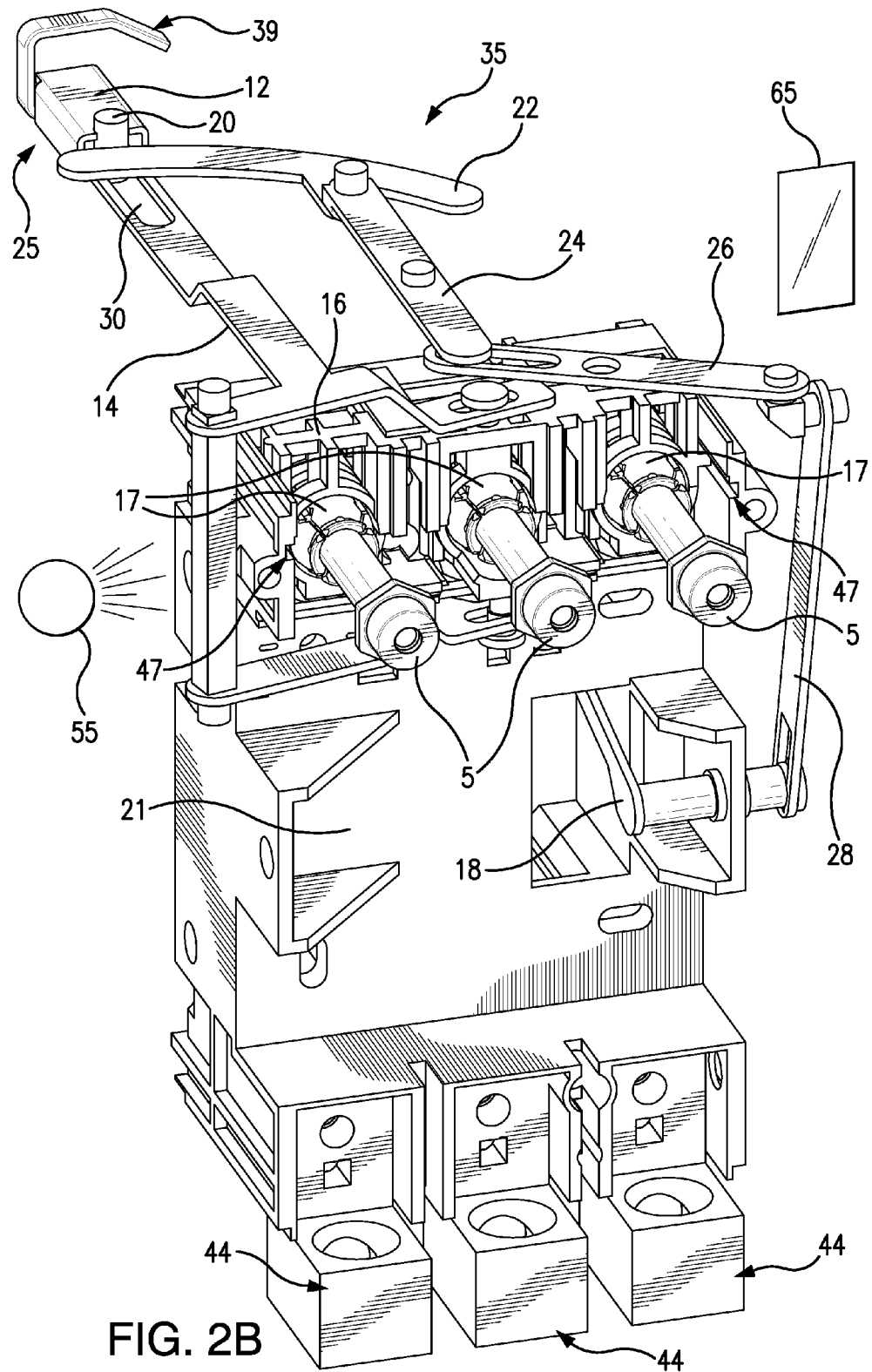
FIG. 2B is a rear perspective view from the top left side of an example embodiment of the invention, illustrating the plug-on base that fits within the housing of the breaker compartment, which serves as a platform for holding the circuit breaker and for mounting various components of a trip actuator and a power connection actuator in the breaker compartment housing.
Figure 3A:
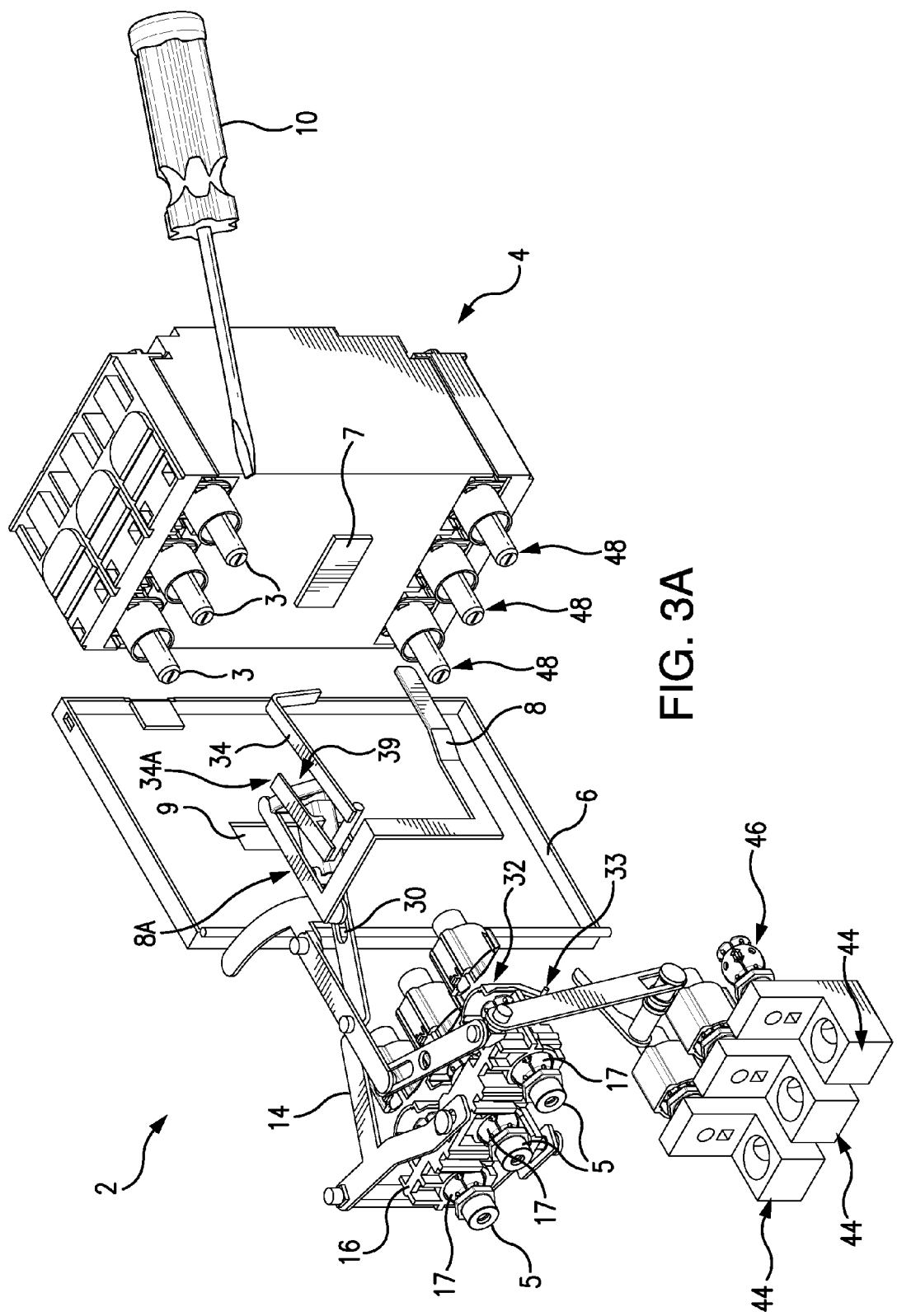
FIG. 3A is a rear perspective view from the top right side of an example embodiment of the invention, illustrating the trip actuator and the power connection actuator. The plug-on base and the housing of the breaker compartment have been removed in this figure and the following figures, to better illustrate some of the other components.

Referencing FIGS. 2B and 3A, FIG. 2B is a rear perspective view from the top left side of an example embodiment of the invention, illustrating the plug-on base 21 that fits within the housing of the breaker compartment 2. The plug-on base 21 serves as a platform for holding the circuit breaker 4 and for mounting various components of a tool interface 25, a trip actuator 35 and a power connection actuator 14 in the breaker compartment housing. A door lock actuator 39 is shown mounted on the power connection actuator 14. The figure further shows three conducting rods 5, for example composed of copper, to be electrically interconnected via bus bars (not shown) to the bus connector 11 (FIG. 2A) and hence to three respective phases of the power bus 19. The figure further shows a slideable carrier 16 mounted on the conducting rods 5, the carrier supporting three slideable connectors 17 to slide on the three respective conducting rods 5. Conducting rods 5 are located towards the back 43 of the lower section 54 of the breaker compartment 2 and are attached to the plug-on base 21. A slideable carrier 16 is made of electrically insulating dielectric material and is mounted in slots 47 molded into the plug-on base 21 within the breaker compartment 2. The slideable carrier 16 supports and carries the slideable connectors 17 for each phase. In an example embodiment, the slideable connectors 17 may be tulip connectors that comprise four metal fingers that are held together with springs on either end to form a cylindrical shape. The tulip connectors 17 slide along conducting rods 5 and are driven forward by the slideable carrier 16 until they slide onto the line side conductor stabs 3 (shown in FIG. 3A) on the circuit breaker 4. The figure also shows three wire lugs 44 to which the branch circuit wires 42 are to be fastened.

In operation, the slideable carrier 16 is driven forward by the power connection actuator 14, moving the slideable connectors 17 along the conducting rods 5 toward the conductor stabs 3 of the circuit breaker 4, to connect the slideable connectors 17 to the respective conductor stabs 3 of the circuit breaker 4, thereby creating electrical connections between the conducting rods 5 and the stabs 3.

A light source 55, such as an LED device, located within the housing, is aligned with the observation window 65, located, for example, in the door 6 of the housing (FIG. 2A), for convenient viewing. In an example embodiment, the LED device may be positioned to shine on a reflective surface on the opposite side of the housing. The reflective surface, such as a mirror, may be oriented so that the operator is able to see it through the observation window 65. If a green light shows in the observation window 65, that indicates the slideable connectors 17 have been disconnected from the circuit breaker stabs 3. If no light shows in the observation window, that indicates the circuit breaker is still connected to the power bus.

In another example embodiment, the light path from the light source 55 to the observation window 65 may be guided within the housing by an optical fiber or light pipe. The light source 55 is further aligned with the carrier 16 when the slideable connectors 17 are connected to the line side conductor stabs 3 of the circuit breaker 4. The light path from the light source 55 to the observation window 65 is blocked by the carrier 16 when the slideable connectors 17 are connected to the stabs. The light path from the light source 55 to the observation window 65 is unblocked by the carrier 16 when the slideable connectors 17 are withdrawn from the stabs, thereby enabling the light source 55 to illuminate the observation window 65 to provide a visual confirmation when the circuit breaker 4 is disconnected from the power bus.

FIG. 3A is a rear perspective view from the top right side of an example embodiment of the invention, illustrating various components of tool interface 25, the trip actuator 35 and the power connection actuator 14. The tool interface 25 comprises a tool receiver 12 that is a spring-loaded socket to receive the operational tool 10. The tool receiver 12 includes a compression spring (not shown) inside the tool receiver 12, which presses the pin 20 toward the tool access slot 36 at the front 41 of the housing 2. The example tool receiver 12 is slideably mounted on the power connection actuator 14 and the pin 20 rides in the slot 30. The trip actuator 35 comprises the linkage of levers 22, 24, 26, and 28 (FIG. 2B), to actuate the tripping lever 18 to trip the circuit breaker 4 when the operational tool 10 is initially received by the tool receiver 12. The power connection actuator 14 slides the three slideable connectors 17 respectively on the three conducting rods 5, to electrically connect the three slideable connectors 17 with the three respective line side conductor stabs 3 of the circuit breaker 4. Shutters 32, composed of an insulating dielectric material, are mounted on pivots 33 that fit in the plug-on base 21 (FIG. 2B). The shutters 32 are shown in their closed position to provide a finger-safe measure by shielding an operator (or the front of the housing 2) from the live conducting rods 5 and slideable connectors 17 when disconnected from the stabs 3 of the circuit breaker. The shutters 32 are configured to open, i.e. pivot out of the way when contacted by the moving slideable connectors 17, to allow passage of the slideable electrical connectors 17 to connect to the conductor stabs 3 of the circuit breaker.

Figure 4:
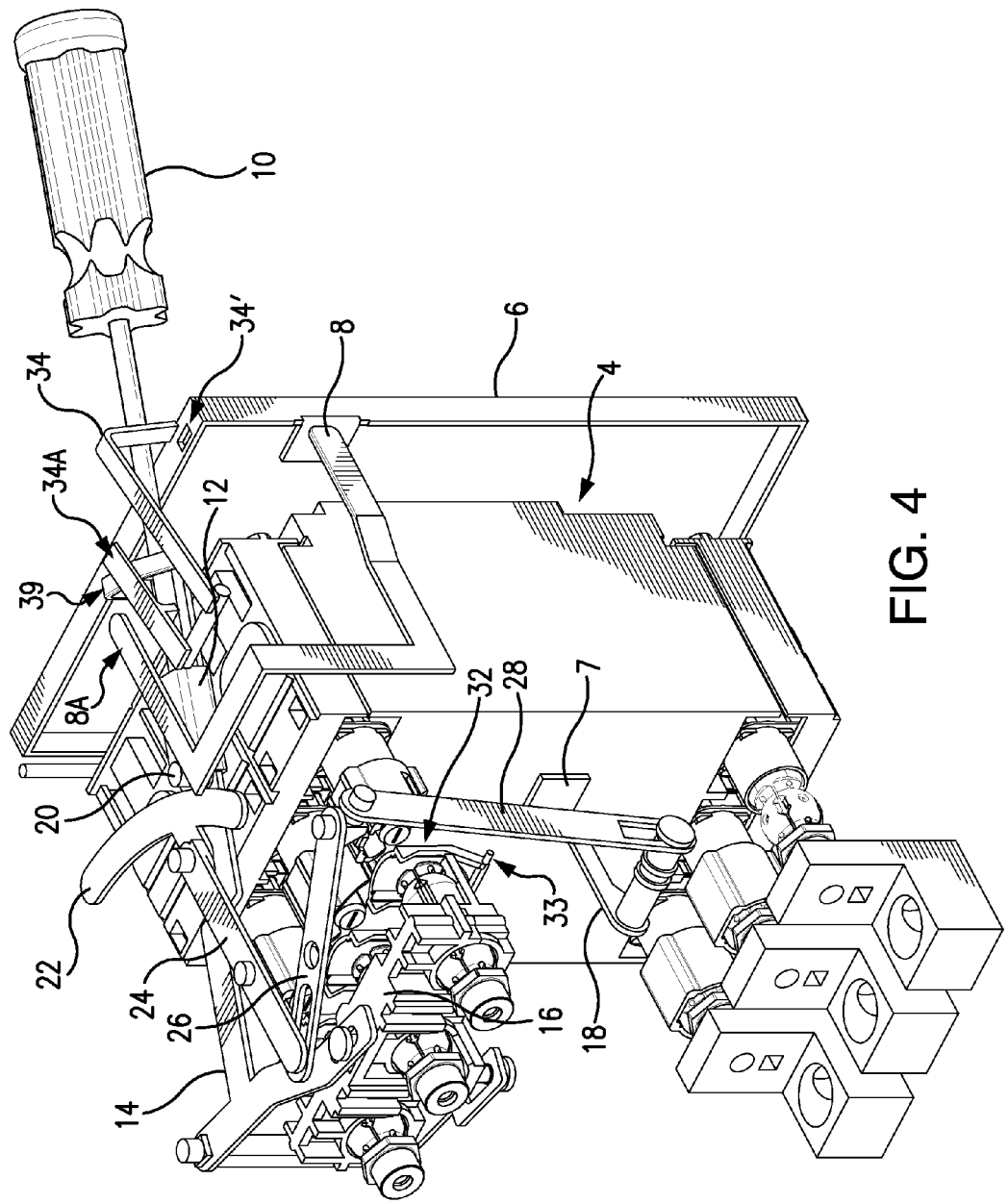
FIG. 4 is a rear perspective view from the top right side of an example embodiment of the invention, illustrating the insertion of an operational tool through an aperture in the housing, into a tool receiver of the tool interface, The figure further shows the tool receiver being connected by a linkage to a tripping lever to trip the circuit breaker when the operational tool is initially received by the tool receiver.
Figure 5:
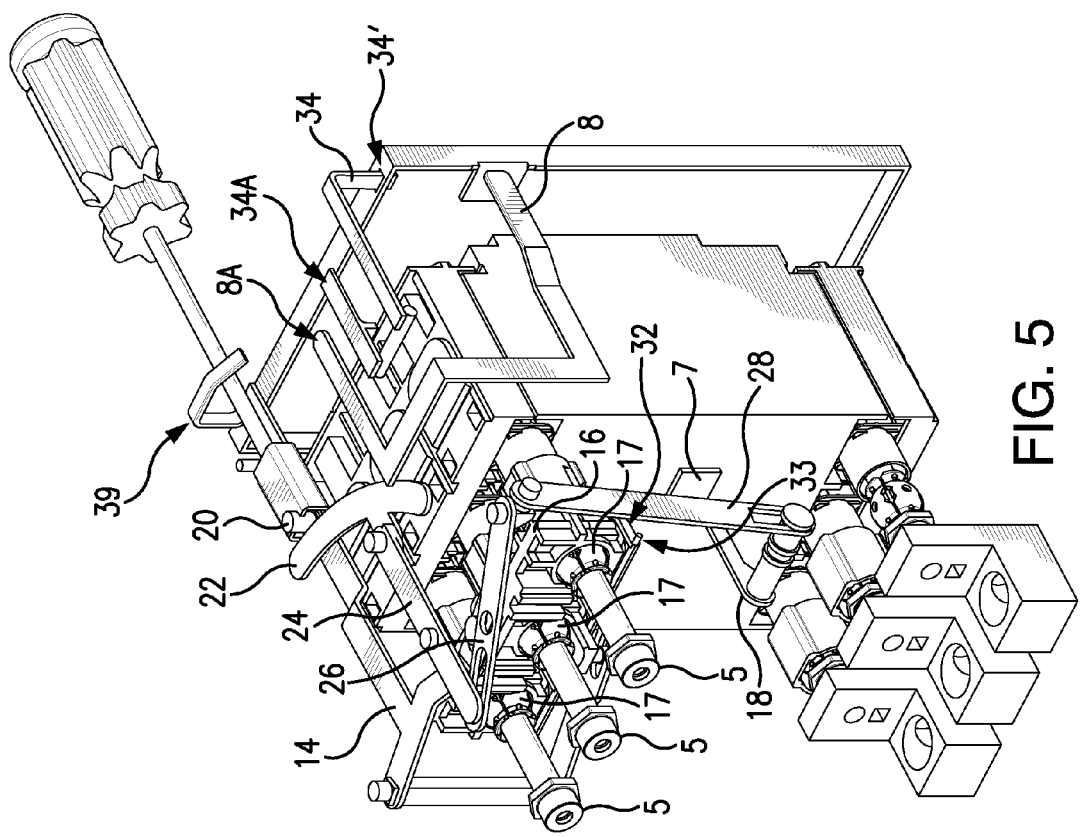
FIG. 5 is a rear perspective view from the top right side of an example embodiment of the invention, illustrating the operational tool actuating the power connection actuator. The power connection actuator causes the three slideable connectors to respectively slide on the three conducting rods, to electrically connect the three slideable connectors to three respective conductor stabs of the circuit breaker.

The figure further shows the door 6 of the breaker compartment 2 in its open position and the circuit breaker 4 positioned outside of the breaker compartment. The door to the compartment may be open whenever an electrician or other user is installing, uninstalling, or in any way performing work on the circuit breaker. The figure shows an interlock lever 8,8A that blocks transverse motion of the power connection actuator 14 while the door 6 is open. The interlock lever 8,8A unblocks the power connection actuator 14 when the door 6 is closed (FIG. 3C). After the door has been closed, a door lock 34, 34A is actuated by the door lock actuator 39 when the operator begins to move the power connection actuator 14 (FIGS. 4 and 5). The figure also shows the three wire lugs 44 to which the branch circuit (load) wires 42 are to be fastened. Three tulip connectors 46 are respectively mounted on the three wire lugs 44. When the circuit breaker is inserted into the breaker compartment 2 (FIG. 3B), the three load side stabs 48 to be connected to the three phase branch circuit, are respectively plugged into the three tulip connectors 46. The plug-on base 21 and the housing of the breaker compartment 2 (except the door 6) have been removed in this figure to better illustrate some of the other components.

Figure 3B:
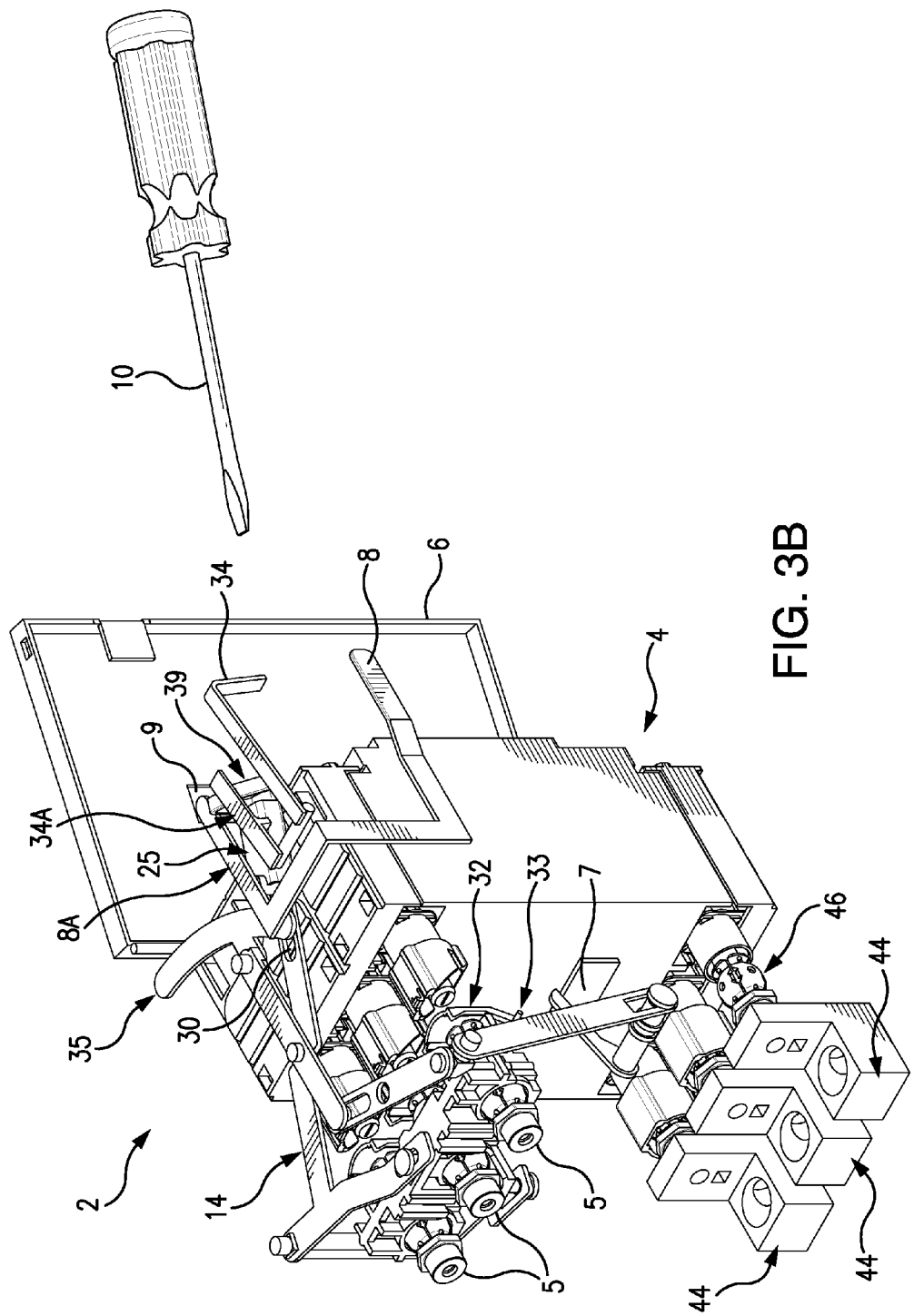
FIG. 3B is a rear perspective view from the top right side of an example embodiment of the invention, illustrating the circuit breaker having been inserted into the plug-on base in the housing of the breaker compartment.
Figure 3C:
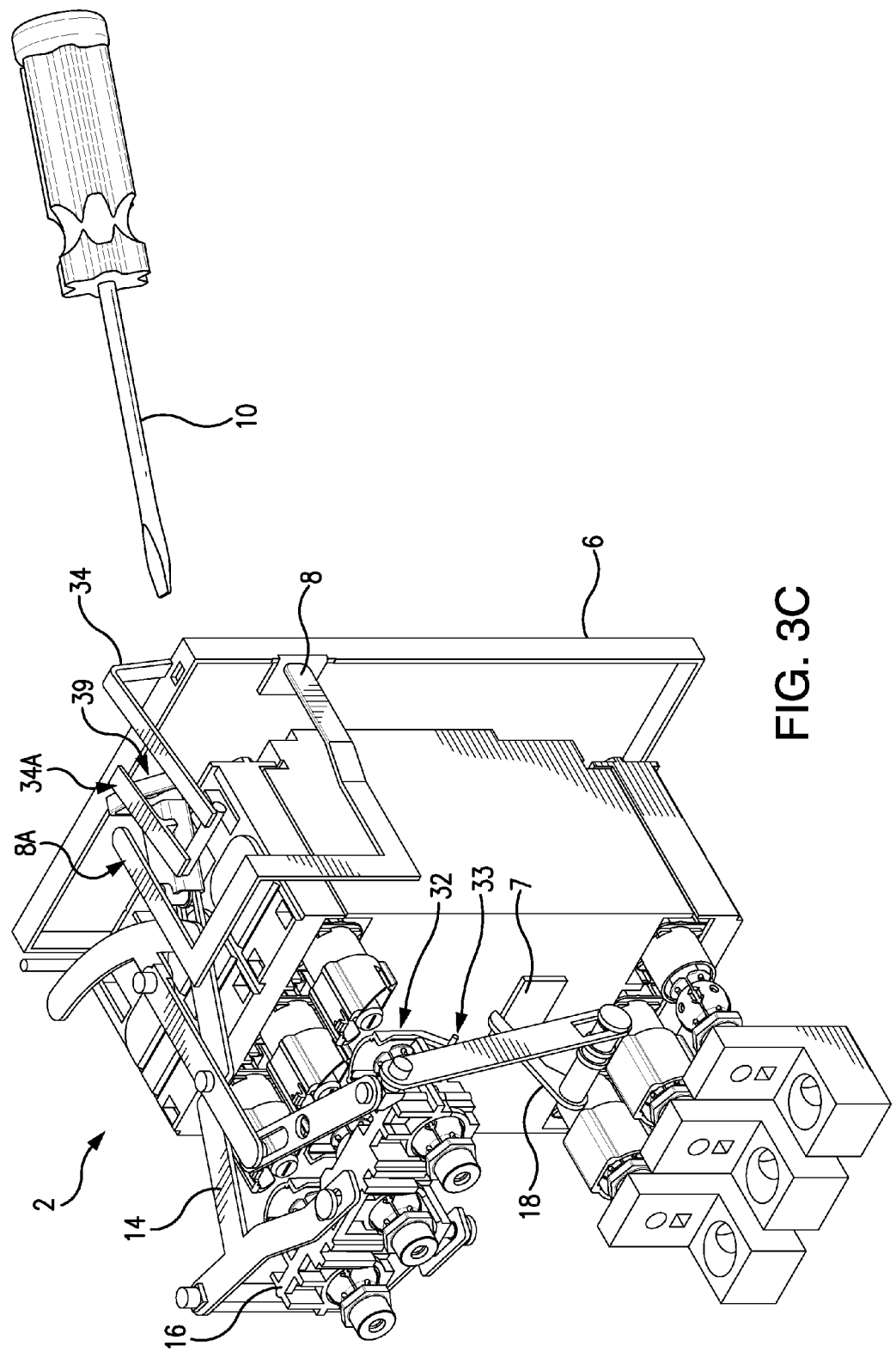
FIG. 3C is a rear perspective view from the top right side of an example embodiment of the invention, illustrating the operation when the door is closed, thereby actuating the interlock arm to unblock the power connection actuator.

FIG. 3B is a rear perspective view from the top right side of an example embodiment of the invention, illustrating the various components of the tool interface 25, the trip actuator 35, and the power connection actuator 14, after the circuit breaker 4 has been inserted into the plug-on base 21 in the housing of the breaker compartment 2. The three load side stabs 48 to be connected to the three phase branch circuit, have been respectively plugged into the three tulip connectors 46. The figure shows the door 6 of the breaker compartment in its open position. The shutters 32 are shown in their closed position. The plug-on base 21 and the housing of the breaker compartment 2 have been removed in this figure to better illustrate some of the other components.

FIG. 3C is a rear perspective view from the top right side of an example embodiment of the invention, illustrating the operation when the door 6 is closed. The figure further shows the interlock lever 8,8A being actuated by contact with the door 6 when the door is closed, to slide out of the way of the door lock actuator 39, to unblock actuation of the power connection actuator 14. The shutters 32 are shown in their closed position. The plug-on base 21 and the housing of the breaker compartment 2, apart from the door 6, have been removed in this figure to better illustrate some of the other components.

FIG. 4 is a rear perspective view from the top right side of an example embodiment of the invention, illustrating the insertion of the operational tool 10 through the tool access slot 36 in the housing, into the tool receiver 12 of the tool interface 25. An example shown of the operating tool 10 is a screwdriver, however it could be another type of tool, including a proprietary tool. Any time that the operating tool 10 is inserted into the tool receiver 12, the circuit breaker is tripped. The linkage of levers 22, 24, 26, and 28 actuate the tripping lever 18 to trip the circuit breaker 4 when the operational tool 10 is initially received by the tool receiver 12. The tripping lever 18 remains in its tripping position long as the operational tool 10 is inserted into the tool receiver 12. This ensures that anytime the slideable connectors 17 connect to the line side stabs 3 of the circuit breaker 4, the stabs 3 are not making or breaking an electrical connection, since they are not designed to do that. Since the power connection actuator 14 has not yet been moved in the figure, the door lock actuator 39 still holds door lock 34 disengaged from the hole 34' in the door 6. The shutters 32 are shown in their closed position. The plug-on base 21 and the housing of the breaker compartment have been removed in this figure to better illustrate some of the other components.

Figure 5A:
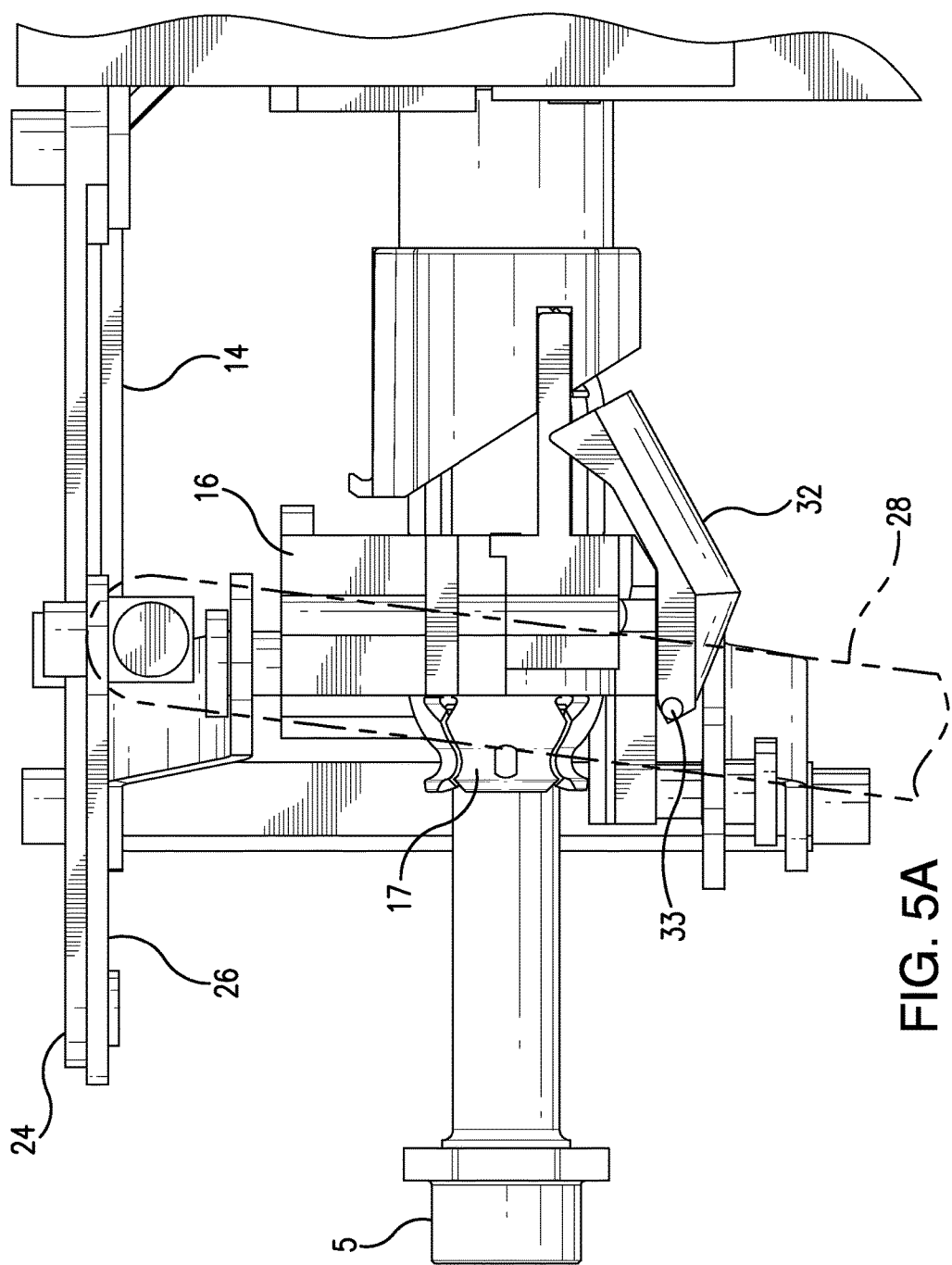
FIG. 5A is a side view of the slideable connectors in the forward position against line side breaker stabs.

FIG. 5 is a rear perspective view from the top right side of an example embodiment of the invention, illustrating the slideable connectors 17 in the forward position against line side breaker stabs 3 (FIG. 3A). FIG. 5A is a side view of the slideable connectors 17 in the forward position against line side breaker stabs 3 (FIG. 3A). The operational tool 10 has actuated the power connection actuator 14, to slide the three slideable connectors 17, respectively, on the three conducting rods 5, to electrically connect the three slideable connectors 17 to the three respective conductor stabs 3 of the circuit breaker 4. FIG. 5 shows that the operational tool 10 is still inserted in the tool receiver 12 and the tripping lever 18 is still lowered in its tripping position. Since the power connection actuator 14 has moved, the door lock actuator 39 slides out from under the door lock 34,34A, which drops the door lock into the hole 34' in the door 6, thereby locking the door closed. The door lock 34,34A may be spring-biased toward the hole 34' in the door. FIG. 5A shows the shutters 32 are in their open position mounted on the pivots 33 that fit in the plug-on base 21 (FIG. 2B), where they have been forced downwardly into a substantially horizontal position out of the way of the advancing slideable connectors 17. The slideable connectors 17 have been extended to make connection to the line side stabs 3 of the circuit breaker 4. The plug-on base 21 and the housing of the breaker compartment have been removed in these figures to better illustrate some of the other components.

Figure 6:
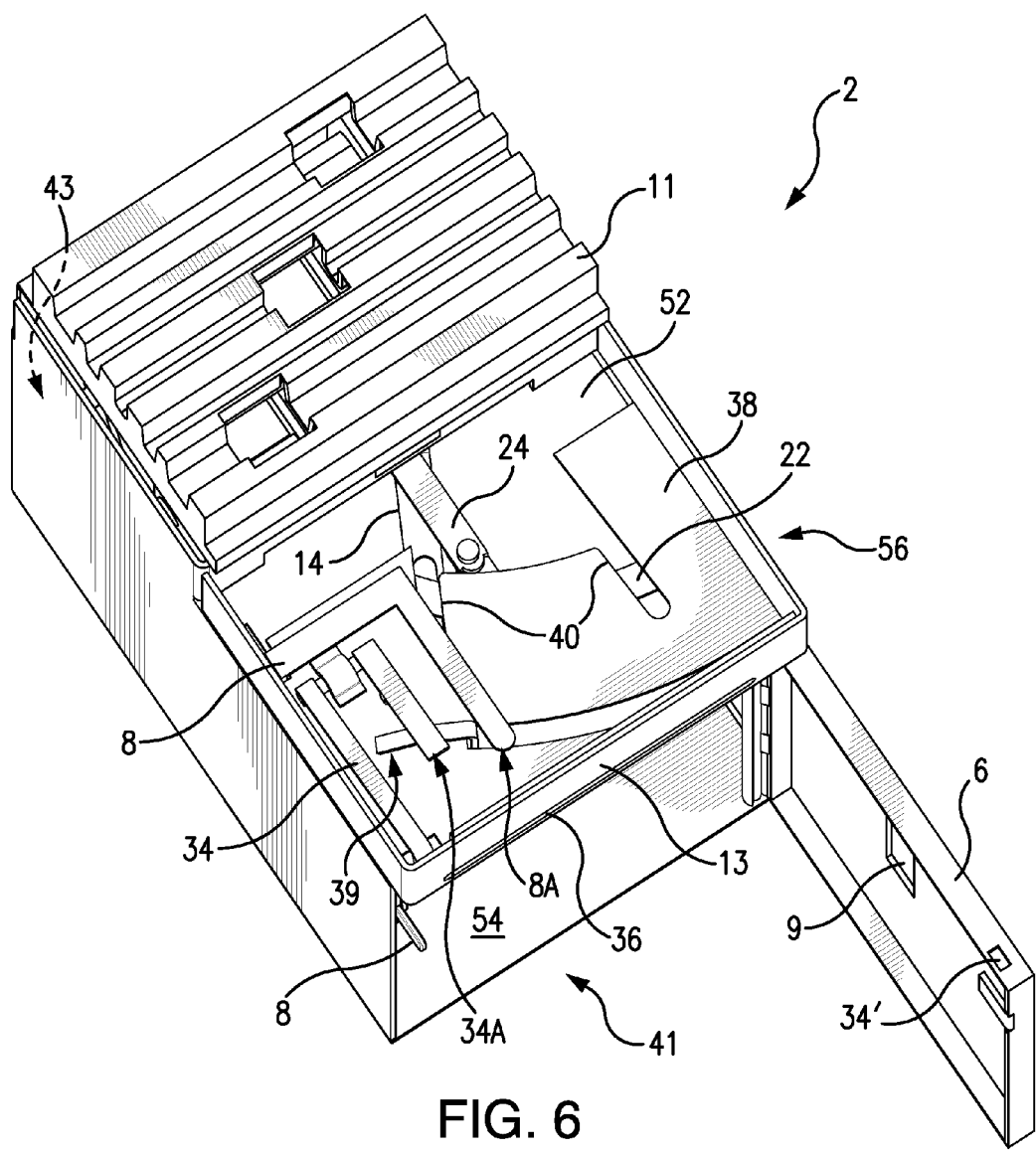
FIG. 6 is a front perspective view from the top left side of an example embodiment of the invention, illustrating a guide slot coupled to the trip actuator and the power connection actuator. The guide slot constrains the trip actuator to trip the circuit breaker before the power connection actuator can be actuated by the operational tool to cause the circuit breaker to electrically connect to the power bus.

FIG. 6 is a front perspective view from the top left side of an example embodiment of the invention, illustrating a guide slot 40 coupled to the lever 22 of the trip actuator 35 and to the power connection actuator 14. The action of inserting the operational tool 10 into the tool receiver 12 causes the trip actuator 35 to trip the circuit breaker. The guide slot 40 prevents actuation of the power connection actuator 14, until the circuit breaker has been tripped. After the circuit breaker 4 has been tripped, the guide slot 40 permits the operator to move the operational tool 10 via the tool interface 25 and to operate the power connection actuator 14 in order to electrically connect the circuit breaker to the power bus. The tripping lever 18 remains in contact with the tripping button 7 throughout the connection operation. After the operational tool 10 has successfully moved the tool receiver 12 to connect the slideable connectors 17 to the stabs 3 (corresponding to FIG. 5), the operator may withdraw the operational tool 10. The tripping lever 18 is spring-loaded and urges lever 22 of the trip actuator 35 to follow the motion of the pin 20 in the guide slot 40, allowing the tripping lever 18 to resume its original position. In its original position, the tripping lever 18 can trip the circuit breaker the next time the operational tool 10 is inserted into the tool receiver 12. This prevents a later disconnection of the circuit breaker from the power bus, without first tripping the circuit breaker.

The guide slot 40 provides a failsafe function by preventing the circuit breaker from resetting its contacts to the "on" position unless the circuit breaker is fully connected to or fully disconnected from the power bus, whether or not the operational tool 10 remains inserted. When the operational tool 10 is retracted, the pin 20 slides to an end of the guide slot 40, holding the pin 20 in either the "on" position with the circuit breaker connected or the "off" position with the circuit breaker disconnected from the power bus. The guide slot 40 guarantees that the connection and disconnection operations can only follow a specified path and that specific actions cannot be performed out of order.

Figure 7:
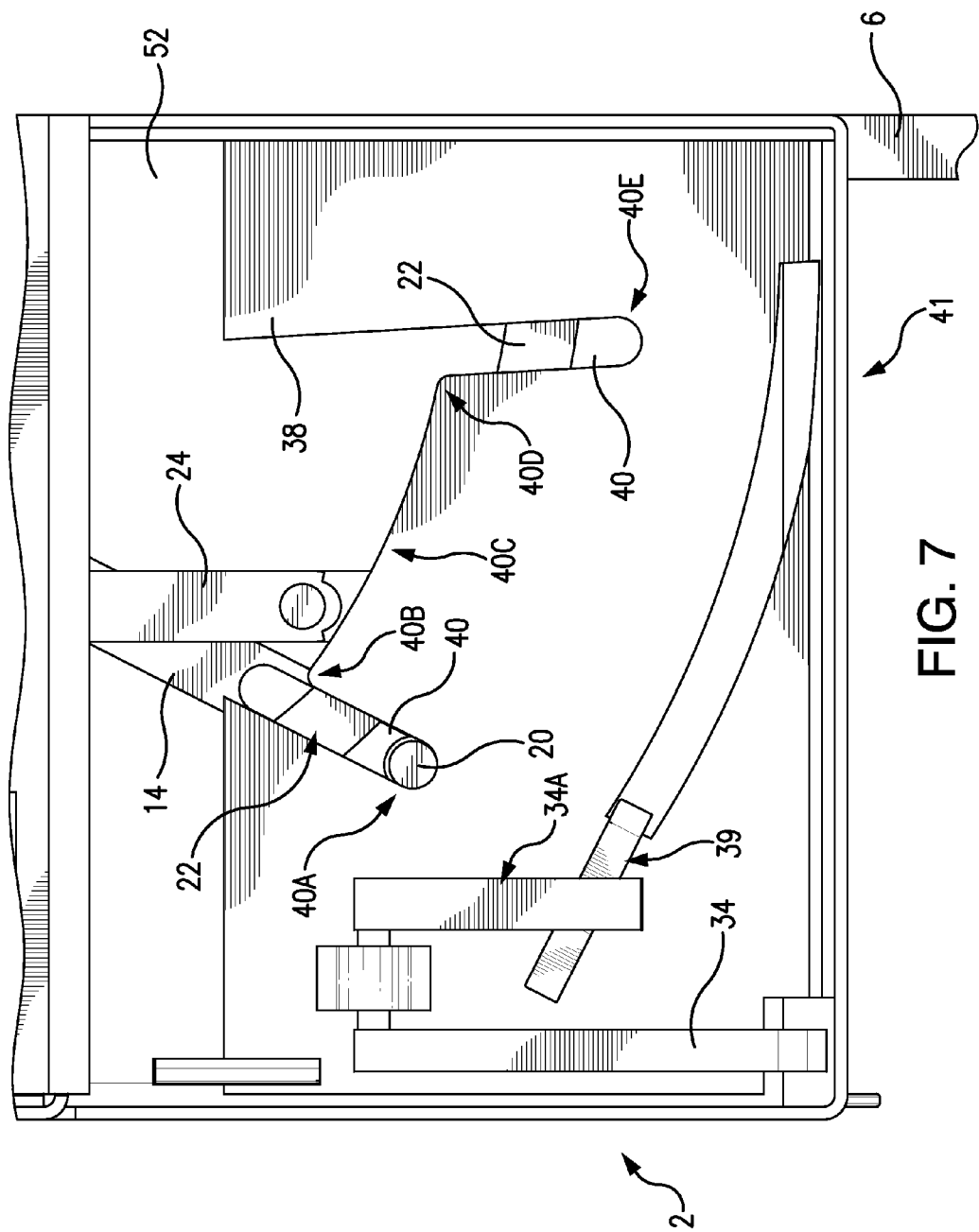
FIG. 7 is a top view of an example embodiment of the invention, illustrating additional details of the guide slot.

FIG. 7 is a top view illustrating additional details of the guide slot 40. In particular, the figure identifies sequential slot positions 40A to 40E of the guide slot 40 that guides the pin 20. The compression spring (not shown) inside the tool receiver 12, presses the pin 20 toward the front 41 of the housing 2. Before the insertion of the tool 10 into the tool receiver 12 (corresponding to FIG. 3C), the spring-loaded pin 20 is held in place in slot position 40A by the compression spring.

When the operational tool 10 is inserted into the tool receiver 12 (corresponding to FIG. 4), the force by the tool 10 on the tool receiver 12, compresses the compression spring and moves the spring-loaded pin 20 from slot position 40A to slot position 40B. In moving to slot position 40B, the pin 20 presses against the lever 22 of the trip actuator 35, and through the linkage 22, 24, 26, and 28, causes the tripping lever 18 to trip the tripping button 7 of the circuit breaker 4.

Then, when the operational tool 10 transversely moves the tool receiver 12 to connect the slideable connectors 17 to the stabs 3 (corresponding to FIG. 5), the transverse force by the tool 10 on the tool receiver 12, moves the spring-loaded pin 20 from slot position 40B through the intermediate slot position 40C, to the slot position 40D, thereby moving the power connection actuator 14 to complete the connection. After the tool 10 has been fully inserted and moves transversely from slot position 40B to slot position 40D to perform the connection operation, the spring-loaded pin 20 continues to follow the guide slot 40 and keeps the compression spring fully compressed in the tool receiver 12, thereby keeping the tripping lever 18 in contact with the tripping button 7 of the circuit breaker 4.

If the tool 10 were to be withdrawn from the tool receiver 12 at an intermediate slot position 40C, before achieving the completed connection shown in FIG. 5, the guide slot 40 constrains the pin 20 to keep the compression spring fully compressed in the tool receiver 12. Thus, the tripping lever 18 remains in contact with the tripping button 7, and the depressed tripping button 7 prevents the circuit breaker from being reset by operating the switch 15 on the front of the breaker.

After the operational tool 10 has successfully moved the tool receiver 12 to connect the slideable connectors 17 to the stabs 3 (corresponding to FIG. 5), the spring-loaded pin 20 will be in slot position 40D. When the operator withdraws the tool 10 from the tool receiver 12, the spring-loaded pin 20 is guided from slot position 40D to slot position 40E. The spring-loaded tripping lever 18 responds by resuming its original position where it can trip the circuit breaker the next time the tool is inserted into the tool interface. This prevents a later disconnection of the circuit breaker from the power bus, without first tripping the circuit breaker.

When the operational tool 10 is later reinserted through the tool access slot 36 in the front cover 13, to disconnect the conductor stabs 3 of the circuit breaker 4, it once again engages the tool receiver 12. The spring-loaded pin 20 will be guided from slot position 40E to slot position 40D to cause the tripping lever 18 to actuate the tripping button 7 to trip the circuit breaker 4. In this manner, if the circuit breaker 4 had been previously in the conducting state, it will be placed into the tripped, non-conducting state before the slideable connectors 17 can be disconnected from the conductor stabs 3 of the circuit breaker 4. In this manner, the guide slot 40 provides a failsafe function of to keep the tripping lever 18 depressed and hence prevent any reset of the circuit breaker 4, whether or not the tool 10 is in the tool receiver 12, so long as the circuit breaker is not in the connected or the disconnected state.

Although specific example embodiments of the invention have been disclosed, it will be apparent to those of skill in the art that changes may be made to the specific example embodiments without departing from the spirit and the scope of the invention.

The invention claimed is:

1. A breaker compartment for housing a circuit breaker in an electrical power distribution enclosure, comprising:
    a housing to electrically connect to a power bus of an electrical power distribution enclosure, the housing having an access side through which to receive a circuit breaker;
    a tool interface in the housing to receive an operational tool;
    a trip actuator coupled to the tool interface, to trip the circuit breaker when the operational tool is received in the tool interface;
    a power connection actuator coupled to the tool interface, to be operated by the operational tool via the tool interface, to electrically connect the circuit breaker to the power bus or to electrically disconnect the circuit breaker from the power bus; and
    a guide slot coupled to the trip actuator and the power connection actuator, to provide failsafe prevention of the circuit breaker from resetting its contacts to the "on" position unless the circuit breaker is fully connected to or fully disconnected from the power bus, whether or not the operational tool remains inserted in the tool interface.

2. The breaker compartment for housing a circuit breaker in an electrical power distribution enclosure of claim 1, further comprising:
    the guide slot being further configured to cause the circuit breaker to be tripped by the trip actuator before the circuit breaker is connected to or disconnected from the power bus.

3. A breaker compartment for housing a circuit breaker in an electrical power distribution enclosure, comprising:
    a housing to fit in an electrical power distribution enclosure, the housing having an access side to enable insertion and removal of a circuit breaker, the housing including a bus connector to electrically connect to a power bus in the electrical power distribution enclosure, the housing including a conducting rod therein electrically connected via the bus connector to the power bus;

a dielectric carrier mounted on the conducting rod, the dielectric carrier supporting a slideable electrical connector to slide on the conducting rod when the dielectric carrier is driven by a power connection actuator to electrically connect or disconnect the slideable connector from a conductor stab of a circuit breaker housed in the housing, thereby electrically connecting or disconnecting the conductor stab from the power bus when the power connection actuator is actuated by an operational tool;

a tool receiver to receive the operational tool through an aperture in the housing, the tool receiver being coupled by a linkage to a tripping lever to trip the circuit breaker when the operational tool is initially received by the tool receiver; and a guide slot coupled to the tool receiver and the power connection actuator, to provide failsafe prevention of the circuit breaker from resetting its contacts to the "on" position unless the circuit breaker is fully connected to or fully disconnected from the power bus, whether or not the operational tool remains inserted in the tool interface.

4. The breaker compartment for housing a circuit breaker in an electrical power distribution enclosure of claim 3, further comprising:

the guide slot being further configured to cause the circuit breaker to be tripped by the tool receiver before the circuit breaker is connected to or disconnected from the power bus.

5. The breaker compartment of claim 3, further comprising:

the housing including a shutter composed of an insulating dielectric material, pivotally mounted in the housing, to close over the slideable electrical connector when the slideable electrical connector is disconnected from the conductor stab of the circuit breaker, to shield an operator from the conducting rod, the shutter being configured to open to allow passage of the slideable electrical connector to connect to the conductor stab of the circuit breaker.

6. The breaker compartment of claim 3, further comprising:

the housing including a door hinged on the housing and covering the access side of the housing; and an interlock lever to block actuation of the power connection actuator while the door is open over the access side, the interlock lever being positioned to be moved by the door when the door is closed, to allow actuation of the power connection actuator.

7. The breaker compartment of claim 3, further comprising:

the housing including a door hinged on the housing and covering the access side of the housing in a closed position; and a door lock to lock the door over the access side, when the power connection actuator is actuated.

8. The breaker compartment of claim 3, further comprising:

the housing including three conducting rods electrically connected via the bus connector to three respective phases of the power bus; and the carrier supporting three slideable connectors to respectively slide on the three conducting rods when the three slideable connectors are driven by the power connection actuator to electrically connect or disconnect the three slideable connectors from three respective conductor stabs of the circuit breaker housed in the housing, thereby electrically connecting or disconnecting the three respective conductor stab from the three respective phases of the power bus when the power connection actuator is actuated by the operational tool.

9. The breaker compartment of claim 8, further comprising:

the housing including three shutters composed of an insulating dielectric material, pivotally mounted in the housing, to respectively close over the three slideable electrical connectors when the slideable electrical connectors are disconnected from the three respective conductor stabs of the circuit breaker, to shield an operator from the conducting rods, the three shutters being configured to open to allow passage of the three slideable electrical connectors to connect to the three respective conductor stabs of the circuit breaker.

10. The breaker compartment of claim 3, further comprising:

a light source in the housing, the light source optically aligned with an observation window in the housing to illuminate the window, to indicate whether the slideable connector has been disconnected from the conductor stab of the circuit breaker.

11. The breaker compartment of claim 3, further comprising:

a plug-on base that fits within the housing of the breaker compartment, the plug-on base being a platform to hold the circuit breaker and to support the power connection actuator in the breaker compartment housing.

12. A breaker compartment for housing a circuit breaker in an electrical power distribution enclosure, comprising:

a housing to electrically connect to a power bus of an electrical power distribution enclosure, the housing having an access side through which to receive a circuit breaker;

a tool interface in the housing to receive an operational tool;

a trip actuator coupled to the tool interface, to trip the circuit breaker when the operational tool is received in the tool interface; and a power connection actuator coupled to the tool interface, to be operated by the operational tool via the tool interface, to electrically connect the circuit breaker to the power bus or to electrically disconnect the circuit breaker from the power bus.

13. The breaker compartment for housing a circuit breaker in an electrical power distribution enclosure of claim 12, further comprising:

a guide slot coupled to the trip actuator and the power connection actuator, to provide failsafe prevention of the circuit breaker from resetting its contacts to the "on" position unless the circuit breaker is fully connected to or fully disconnected from the power bus, whether or not the operational tool remains inserted in the tool interface.

14. The breaker compartment for housing a circuit breaker in an electrical power distribution enclosure of claim 13, further comprising:

the guide slot being further configured to cause the circuit breaker to be tripped by the trip actuator before the circuit breaker is connected to or disconnected from the power bus.

* * * * *